(12) United States Patent
Sarkar

(10) Patent No.: US 7,174,372 B1
(45) Date of Patent: Feb. 6, 2007

(54) SYSTEM AND METHOD FOR MANAGING ROUTER METADATA

(75) Inventor: Manojit Sarkar, Fremont, CA (US)

(73) Assignee: Fortinet, Inc., Sunnyvale, CA (US)

( * ) Notice: Subject to any disclaimer, the term of this patent is extended or adjusted under 35 U.S.C. 154(b) by 498 days.

(21) Appl. No.: 09/663,484

(22) Filed: Sep. 13, 2000

(51) Int. Cl.
G06F 15/173 (2006.01)

(52) U.S. Cl. .................. 709/223; 709/220; 717/170; 707/102

(58) Field of Classification Search ............. 709/218, 709/224, 228, 223, 220; 717/169, 170; 707/102
See application file for complete search history.

(56) References Cited

U.S. PATENT DOCUMENTS

| | | | |
|---|---|---|---|
| 4,667,287 A | 5/1987 | Allen et al. | |
| 5,490,252 A | 2/1996 | Macera et al. | |
| 5,581,705 A | 12/1996 | Passint et al. | |
| 5,745,778 A | 4/1998 | Alfieri | |
| 5,812,779 A * | 9/1998 | Ciscon et al. ............ | 709/223 |
| 5,825,772 A | 10/1998 | Dobbins et al. | |
| 5,841,973 A | 11/1998 | Kessler et al. | |
| 5,963,555 A | 10/1999 | Takase et al. | |
| 6,047,330 A | 4/2000 | Stracke | |
| 6,069,895 A | 5/2000 | Ayandeh | |
| 6,098,110 A | 8/2000 | Witowski et al. | |
| 6,169,739 B1 | 1/2001 | Isoyama | |
| 6,173,399 B1 | 1/2001 | Gilbrech | |
| 6,175,867 B1 | 1/2001 | Taghadoss | |
| 6,220,768 B1 | 4/2001 | Barroux | |
| 6,226,788 B1 * | 5/2001 | Schoening et al. ....... | 717/107 |
| 6,243,580 B1 | 6/2001 | Garner | |
| 6,260,072 B1 | 7/2001 | Rodriguez | |
| 6,260,073 B1 | 7/2001 | Walker et al. | |
| 6,266,695 B1 | 7/2001 | Huang et al. | |
| 6,286,038 B1 | 9/2001 | Reichmeyer et al. | |
| 6,295,297 B1 | 9/2001 | Lee | |
| 6,298,130 B1 * | 10/2001 | Galvin ...................... | 379/219 |
| 6,317,748 B1 * | 11/2001 | Menzies et al. .......... | 707/103 X |
| 6,330,602 B1 | 12/2001 | Law et al. | |
| 6,338,092 B1 | 1/2002 | Chao et al. | |
| 6,434,619 B1 | 8/2002 | Lim et al. | |
| 6,449,650 B1 | 9/2002 | Westfall et al. | |
| 6,459,682 B1 | 10/2002 | Ellesson et al. | |
| 6,463,061 B1 | 10/2002 | Rekhter et al. | |
| 6,466,976 B1 | 10/2002 | Alles et al. | |
| 6,526,056 B1 | 2/2003 | Rekhter et al. | |
| 6,532,088 B1 | 3/2003 | Dantu et al. | |
| 6,556,544 B1 | 4/2003 | Lee | |

(Continued)

OTHER PUBLICATIONS

Gasparro, D.M., "Next-Gen VPNs: The Design Challenge." Data Communications. Sep. 1999. pp. 83-95.

(Continued)

Primary Examiner—Frantz B. Jean
(74) Attorney, Agent, or Firm—Hamilton & Desanctis

(57) ABSTRACT

A computerized method for managing network device metadata is provided. According to one embodiment, a metadata file is created which is an ASCII representation of objects in a router. The router metadata is read by an application such as a service management system application. The metadata is converted into a runtime object model. In one embodiment, the objects in the runtime object model are loaded onto a router or a service processing switch using SNMP functions. The objects are then inserted into the SNMP MIB.

17 Claims, 1 Drawing Sheet

U.S. PATENT DOCUMENTS

| | | | |
|---|---|---|---|
| 6,631,519 B1 * | 10/2003 | Nicholson et al. | 717/169 |
| 6,636,516 B1 | 10/2003 | Yamano | |
| 6,639,897 B1 | 10/2003 | Shiomoto et al. | |
| 6,658,013 B1 | 12/2003 | de Boer et al. | |
| 6,697,360 B1 | 2/2004 | Gai et al. | |
| 6,775,267 B1 | 8/2004 | Kung et al. | |
| 2001/0034733 A1 * | 10/2001 | Prompt et al. | 707/102 |
| 2001/0043571 A1 | 11/2001 | Jang et al. | |
| 2001/0052013 A1 | 12/2001 | Munguia et al. | |
| 2002/0152373 A1 | 10/2002 | Sun et al. | |
| 2003/0033401 A1 | 2/2003 | Poisson et al. | |

OTHER PUBLICATIONS

Hanaki, M. et al., "LAN/WAN management integration using ATM CNM interface." IEEE Network Operations Management Symposium, vol. 1. Apr. 1996. pp. 12-21.

Kapustka, S., "CoSine Communications Move VPNs 'Into the Cloud' with the Leading Managed IP Service Delivery Platform." http://wwwcosinecom.com/news/pr_5_24.html. Press Release, CoSine Communications. 1995. p. 5.

Keshav, S., "An Engineering Approach to Computer Networking: ATM networks, the internet, and the telephone network." Reading Mass: Addison-Wesley, Addison-Wesley Professional Computing Series. 1992. pp. 318-324.

Rao, J.R., Intranets and VPNs: Strategic Approach. 1988 Annual Review of Communications. 1998. pp. 669-674.

Tanenbaum, A.S., "Computer Networks." Upper Saddle River, N.J.: Prentice Hall PTR, 3rd Edition. 1996. pp. 348-364.

* cited by examiner

SYSTEM AND METHOD FOR MANAGING ROUTER METADATA

FIELD

The present invention relates generally to computer network routers, and more particularly to systems and methods of managing metadata for such routers.

RELATED FILES

This application is related to the following cofiled, copending and coassigned applications:

"SYSTEM AND METHOD FOR MANAGING AND PROVISIONING VIRTUAL ROUTERS", Ser. No. 09/663,485, and to two provisional applications each titled "SYSTEMS AND METHOD FOR DELIVERING INTERNETWORKING SERVICES", Ser. Nos. 60/232,577 and 60/232,516;

all of which are hereby incorporated herein by reference for all purposes.

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright © 2000, CoSine Communications, Inc. All Rights Reserved.

BACKGROUND

The interest in the deployment of routers and virtual private networks (VPNs) across IP backbone facilities is growing every-day. Typically, routers and service processing switches include many network components (NCs). The software that deals with these components typically requires data that describes the component and the configuration of components within the system. In previous systems, this data has been either hard coded into the software or class definitions associated with the software, or it has been provided in an Interface Definition Language (IDL) that must be interpreted.

There are several problems with the techniques described above. First, if the data is hard coded into software or the class definitions associated with the software, the software must be recompiled every time a change is made to the metadata. This can be problematic, because it is often necessary to support multiple versions of the software and hardware associated with the router or service processing switch. These multiple versions arise due to changes in product versions, changes in supported features, and changes in hardware versions. In previous systems, these changes required recompiling and rebuilding the software, or reinterpreting the IDL to produce new source code that must be built into the system. Furthermore, because the source code changes, it is necessary to retest the software that uses the metadata.

SUMMARY

The above-mentioned shortcomings, disadvantages and problems are addressed by the present invention, which will be understood by reading and studying the following specification.

In one embodiment of the invention, a computerized method for managing router metadata performs the following tasks. A metadata file is created which is an ASCII representation of objects in a router. The router metadata is read by an application such a service management system application. The metadata is converted into a runtime object model. In one embodiment, the objects in the runtime object model are loaded onto a router or a service processing switch using SNMP functions. The objects are then inserted into the SNMP MIB.

The present invention describes systems, clients, servers, methods, and computer-readable media of varying scope. In addition to the aspects and advantages of the present invention described in this summary, further aspects and advantages of the invention will become apparent by reference to the drawings and by reading the detailed description that follows.

DETAILED DESCRIPTION

Figure 1:
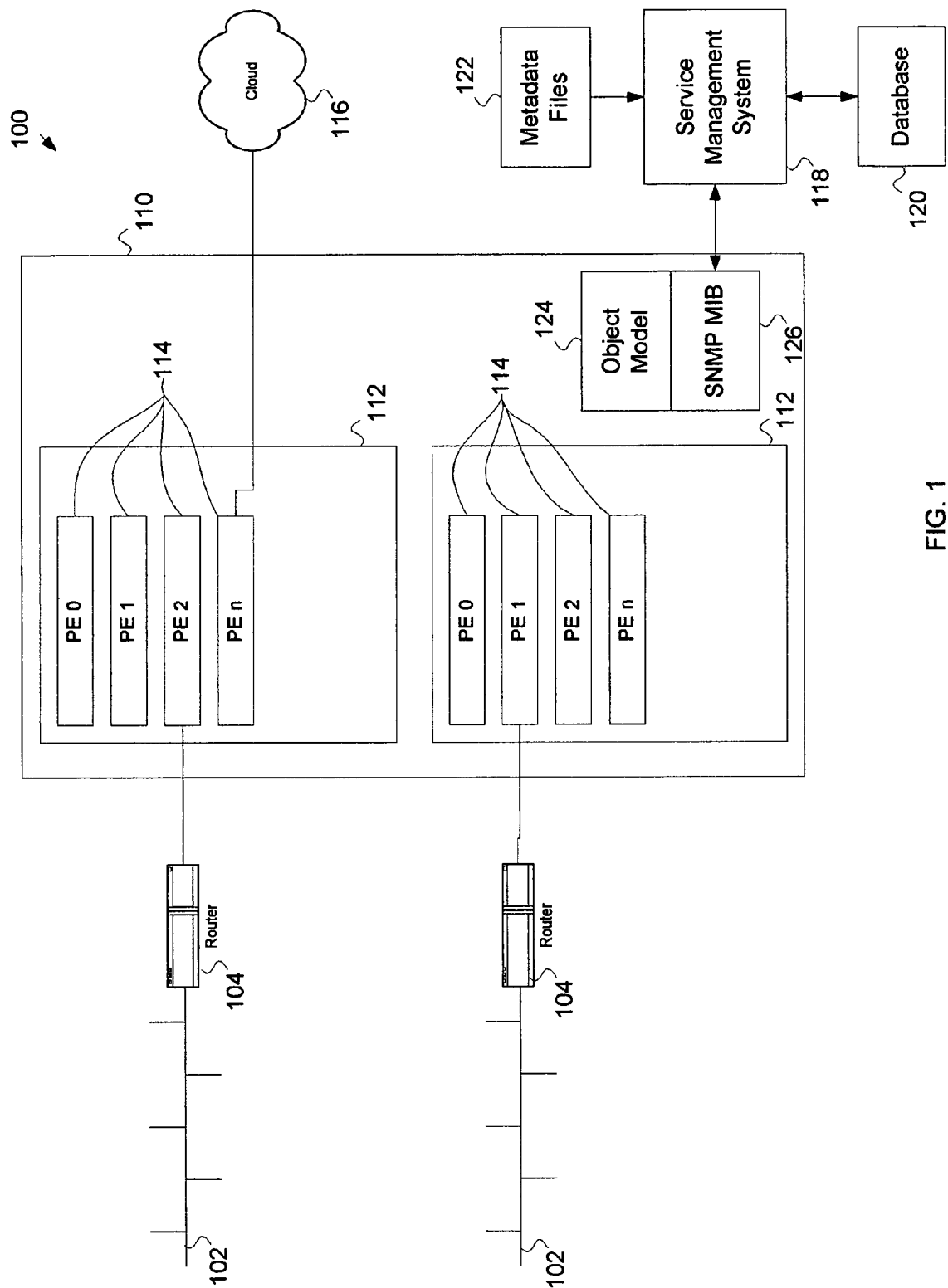
FIG. 1 is a block diagram of the hardware and operating environment in which different embodiments of the invention can be practiced.

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the scope of the present invention. The following detailed description is, therefore, not to be taken in a limiting sense.

In the Figures, the same reference number is used throughout to refer to an identical component which appears in multiple Figures. Signals and connections may be referred to by the same reference number or label, and the actual meaning will be clear from its use in the context of the description.

The detailed description is divided into multiple sections. In the first section the hardware and operating environment of different embodiments of the invention is described. In the second section, the software environment of varying embodiments of the invention is described. In the final section, a conclusion is provided.

Hardware and Operating Environment

FIG. 1 is a diagram of the hardware and operating environment in conjunction with which embodiments of the invention may be practiced. The description of FIG. 1 is intended to provide a brief, general description of suitable computer routing hardware and a suitable computing environment in conjunction with which the invention may be implemented. Although not required, the invention is described in the general context of computer-executable instructions, such as program modules, being executed by a computer, such as a personal computer or a server computer. Generally, program modules include routines, programs, objects, components, data structures, etc., that perform particular tasks or implement particular abstract data types.

As shown in FIG. 1, the system 100 includes a service processing switch 110, access routers 104, service management system 118, and customer network management system 106. In some embodiments, service processing switch 110 provides switching, routing and computing resources that can be allocated by a service provider to customers. In one embodiment, the service processing switch 110 is the IPSX 9000 service processing switch from CoSine Communications, Inc. However, the invention is not limited to any particular switch, router or service processing hardware.

Service processing switch can contain one or more blades 112. In some embodiments of the invention, blades 112 have a type associated with them. Examples of blade types include, processing functions such as network blades, control blades, trunk blades, and processor blades. Network blades provide interfaces to different types of networks. Control blades provide system management and accounting functions to the service processing system 110. Trunk blades provide access to high speed trunk networks. Processor blades provide general purpose computer processors that in some embodiments of the invention provide firewall, intrusion detection, or directory services. Blades are communicably coupled to one another, in one embodiment a packet ring is used to couple the blades.

In some embodiments, each of blades 112 includes one more processing elements 114. Processing elements 114 include CPU and memory that provide computing resources for the blade. The invention is not limited to any particular number of processing elements on a blade, nor is the invention limited to any particular number of blades in a service processing switch 110.

Service processing system 110 is typically communicably coupled to a network 116, for example the Internet. Network 116 can also be a Wide Area Network (WAN), a Local Area Network (LAN), or a private network.

Service processing system 110 is also typically communicably coupled to a plurality of customer networks 102 via customer access routers 104.

Service management system 118 is communicably coupled to service processing system 110, and hosts software that is used to configure and control the operation of service processing switch 110. In one embodiment of the invention, the service management system is a SPARC system available from Sun Microsystems, Inc. running the InVision product from CoSine Communications, Inc. Service management system 118 can be used to define and allocate resources within service processing switch 110 to various customers. In some embodiments, the Simple Network Management Protocol (SNMP) is used to communicate with the service processing system.

Service management system 118 accesses router metadata (also referred to as meta information) file 122, which provides descriptions of objects and relationships between objects that represent components of service processing switch 110. In one embodiment, the router metadata files contain NC (Network Component) class descriptions having the following form:

```
class <class_name>
{
    <field_name> = <field_value>;
    <field>
    <field_name> = { <field value1>, <field_value2>, ... }
    <attribute>
    <attribute>
    <attribute>
    <attribute>
    <attribute>
    <attribute_group>
    <attribute_group>
}
```

In one embodiment of the invention, the following fields are included:
  mainMibTable
  rowStatusMibObj
  otherMibTables
  isSingle
  databaseTable Those of skill in the art will appreciate that other fields can be included as desired.

Each <attribute> has the form:
```
attribute
{
    name =      <value>;
    type =      Int (<min> ... <max>) |
                String (<size>) |
                DottedString (<maxsize>) (<dotcount) |
    {
    }
    type = Int (<min> ... <max> | String | Float | DottedString |
Enum { <stringvalue> (<intvalue>), ... };
    displayName = <quotedstring>;
    mibAccessPolicy =
    cachingPolicy =
    databaseColumn =
    mibObj =
    isMandatory =
    identifies
    dotCount=<value>;
}
```

Each <identifies> is of the form:

```
        identifies
        {
                relatedClass=
                relation=
                attributeName=
                alternateAttributeName=
        }
```

Each <attribute_group> is of the form:

```
attributeGrp
{
    grpName=
    tblName=
    attributeNames= { <attribute_name> [, <attribute_name>, ... ] }
}
```

A set of exemplary metadata files according to an embodiment of the invention is provided in Appendix A.

A set of API definitions for manipulating the metadata defined by the metadata is provided in Appendix B.

At runtime, service management system 118 reads one or more of the metadata files 122, and creates a hash table of attribute and attribute name value pairs. In one embodiment, concrete NC classes inherit all code from abstract base NC class, but if necessary, they can override some methods to implement NC class specific behavior.

In some embodiments of the invention, at runtime, the service management system or other application desiring to read the metadata will be told of the location of the meta information through environment variables as is known in the art. In one particular environment, the variables are the COSS_METAINFO_DIR and COSS_METAINFO_SUB-SETS_FILE environment variables or COSS configuration file entries.

The COSS_METAINFO_DIR specifies where to look for meta information files. The COSS_METAINFO_SUB-SETS_FILE specifies which file defines meta information subsets. Meta information subsets are used to allow specific applications to load only specific subsets of meta information needed by that application.

Basically meta information is contained in a set of METAINFO_FILES and COSS_METAINFO_SUBSETS_FILE defines which files belong to which subset as follows:

```
#metainfo subsets file, comment line
subset config
{
     classes = { System, Blade, . . . }
     files = { IpsxSystemMetainfo.txt, IpsxConfigMetainfo.txt, . . . }
}
subset vpn
{
    # if classes are missing load all classes in files
    files = { IpsxSystemMetainfo.txt, IpsxVpnMetainfo.txt }
}
```

Behaviors that can be implemented through the base NC class and inherited without any modification include:
  all SNMP communications for the NC class
  all database transactions for the NC class
  all application server and server communications for the NC class
  adding, removing relations between NC objects
  get, set attribute values
  create, delete NC objects
  printing Furthermore, it is possible to implement NC specific behavior (business rules and logic), by overriding base NC class method or implementing new methods for each concrete NC class.

In some embodiments, the servers and clients that have access to the metadata files 122 can access meta information from the same source in order to avoid the problem of metadata being out of sync. In one embodiment, the metadata is kept in ASCII files to further solve this problem. Also, maintaining the metadata files in a single known location is desirable, because it makes it simple to share as well as enter and edit meta information without access conflict between developers.

In some embodiments of the invention, applications such as service management system 118 only loads the required subset of meta information for a specific application. For example an IPSec application would not necessarily need to load "configuration" meta information.

Furthermore, in some embodiments, the metadata can be loaded into a database 120. The database can be an Oracle database, however the invention is not limited to any particular type of database. In alternative embodiments, the database can be Informix, Sybase, SQL Server, or an object oriented database.

Those skilled in the art will appreciate that the invention may be practiced with other routing system hardware configurations besides those described above.

Methods For Managing Router Metadata

In the previous section, a system level overview of the operation of exemplary embodiments of the invention were described. In this section, the particular methods of the invention performed by an operating environment executing an exemplary embodiment are described. The methods to be performed by the operating environment constitute computer programs made up of computer-executable instructions. Describing the methods enables one skilled in the art to develop such programs including such instructions to carry out the methods on suitable computers (the processor of the computer executing the instructions from computer-readable media). The method described below are inclusive of the acts required to be taken by an operating environment executing an exemplary embodiment of the invention.

In a first method, an application, such as service management application 118 reads a runtime object model representing the configuration of the service processing switch or router. In one embodiment, the SNMP MIB data 126 is read. The configuration as specified by the runtime object model 124 is compared to the data in the metadata files 122. The differences are determined and the service processing switch is updated with the changes.

In a second method, an application, such as service management application 118 reads a runtime object model 124 representing the configuration of the service processing switch or router. In one embodiment, the SNMP MIB data 126 is read. The configuration as specified by the runtime object model 124 is compared to the data in the metadata files 122. The differences are determined and the metadata files 122 are updated to reflect the configuration changes made on the service processing switch. This allows the metadata 122 to be updated with changes that were applied (perhaps manually) after the metadata 122 was originally loaded onto the service processing switch.

In a third method, the metadata files 122 are reloaded onto the service processing switch. In some embodiments, SNMP is used to perform the update. This allows the switch to be restored to an original configuration.

CONCLUSION

Systems and methods for managing router metadata are disclosed. Embodiments of the invention provide advantages over previous systems. For example, according to various embodiments of the invention, "static" (as opposed to "dynamic" or "run time") information about the router or service processing switch device's objects (NC objects) are modeled by the system management applications. Since this information is captured in one place (e.g., in ASCII files) and not in multiple IDL, MOSU, C++ or Java classes, changing this information is easier. In addition, everyone desiring the metadata can stay in sync by referring to the same metadata file.

Furthermore, since, according to one embodiment, information is captured in ASCII files (and not IDL, MOSU, C++ or Java code), when this information changes, no recompilation or rebuilding and most importantly retesting of libraries and executables are needed.

Additionally, new devices (MIBS) can be supported by writing ASCII files and with minimal or no code enhancements.

Since all NC objects are treated in a uniform way, it is possible to design one abstract base (one Java, one C++ and one MOSU) class that implements the common behavior of all concrete NC classes. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

The terminology used in this application is meant to include all of these environments. It is to be understood that the above description is intended to be illustrative, and not restrictive. Many other embodiments will be apparent to those of skill in the art upon reviewing the above description. Therefore, it is manifestly intended that this invention be limited only by the following claims and equivalents thereof.

APPENDIX A

```
# this is a comment line
# IpsxSystemMetainfo.txt
class System              # the rest of the line is comment line
{
    isSingle = true;      # there is only one System object for an IPSX device
    attribute       # this is the attribute's display name
    {
        name = 0;
        type = String;
        displayName = "name";
        mibObj = sysName;
        mibAccessPolicy = RW_ACCESS;   # this is the default
        cachingPolicy = CACHE_PERSISTENTLY;    # this is the default
        defaultValue = "DEFVAL"; # specifiy default value only if it exists
        isMandatory = false;
    }
}
#next file starts here
# file name IpsxConfigMetainfo.txt
class Blade
{
    isSingle = false;                  # this is default, so it can be, but need not be specifi
    mainMibTable = csOrionEnginetable;  # this must be specified for non-singleton NCs
        . . .
}
class Engine
{
    mainMibTable = csOrionEnginetable;
        . . .
}
class Ds3Port
{
        . . .
}
class Ds1Port
{
        . . .
}
class FrCircuit
{
        mainMibTable = csFrCircuitTable;
        rowStausMibObj = csFrCircuitRowStatus;
        attribute
        {
            name = 2;
            type = Int;
            displayName = "circuit index";
            mibObj = csFrCircuitIndex;
            isMandatory = true;
            mibAccessPolicy = NO_ACCESS;
            cachingPolicy = CACHE_PERSISTENTLY;
            identifies
            {
                relClass = FrCircuit;
            }
        }
        attribute
        {
            name = 9;
            type = Enum { up (1), down (2) }
            displayName = "state";
        }
```

APPENDIX A-continued

```
}
# this is a comment line
# file IpsxVpnMetainfo.txt
class Vpn
{
...
}
class Vr
{
...
}
class Vi
{
...
        mainMibTable = csOrionVIfaceTable;
        rowStatusMibObj = csOrionVIRowStatus;
        otherMibTables = { . . . }
    attribute
    {
        name = vpnIndex;
        type = Int;
        displayName = "VPN index";
        ...
        identifies
            {
                    relatedClass = Vi;
            }
            identifies
            {
                    relatedClass = Vr;
                    attributeName= . . .
                relation = IS_CONTAINED_BY; # manatory if relClass is not self
            }
            identifies
            {
                    relClass = Vpn;
                relation = IS_ASSOCIATED_WITH; # use this for indirect relations
                    attributeName = . . .
                    alternateAttributeName = 1;
            }
    }
    attribute
    {
        name = vrIndex;
        type = DottedString;
        dotCount = 3;
        displayName = "VR index";
        ...
    }
    attribute
    {
    }
        attribute
        {
            name = . . .
                displayName = "InOctets";
        ...
        }
    attribute
    {
        name = . . .
        displayName = "InUcastPkts";
        ...
    }
    attribute
    {
        name = . . .
        displayName = "InNUcast";
        ...
    }
                attributeGroup
            {
                groupName = ViStats;
                tableName = csOrionViStatsTable;
                attributeNames = { vrIndex, . . . }
}
            }
```

APPENDIX B

```
class MetainfoStore
{
    private:
            MetainfoStore( ) { };
    public:
    static   void Init (const char * metainfoSubsetName);
    static   NcMetainfo * GetNcMetainfo (NcType ncType);
    static   NcAttrMetainfo * GetAttrMetainfo (NcAttrName, NcType);
    static   NcAttrMetainfo * GetAttrMetainfo (const char * attrName, NcType);
    static   NcAttrGrpMetainfo * GetAttrGrpMetainfo (const char * grpName, NcType
ncType);
}
class NcMetainfo
{
    public:
            boolean IsSingleton( );
            char * GetMainMibTable ( );
            char * GetRowStatusMibObj ( );
            void GetOtherMibTables (VoidPtrList * tableNames);
            NcAttrMetainfo * GetAttrMetainfoByName (const char * attrName);
            NcAttrMetainfo * GetAttrMetainfoByMibObj (const char * mibObj);
            NcAttrGrpMetainfo * GetAttrMetainfoByName (const char * grpName);
            void GetIdAttrMetainfos (VoidPtrList & idAttrMetainfos, NcType
relatedNcType = SELF);
            void GetNonIdAttrMetainfos (VoidPtrList & idAttrMetainfos, NcType
relatedNcType = SELF);
            void GetAttrMetainfosByName (StrHashtable & attrNames, VoidPtrList &
attrMetainfos);
            void GetRelatedNcMetainfos
            (
                VoidPtrList & attrMetainfos,
                NcRelationType = UNKNOWN_RELATION,
                relatedNcType = UNKNOWN_NC_TYPE
            );
}
class NcIdRole
{
    public:
        NcRelationType GetRelationType ( );
        NcType GetRelatedNcType ( );
        NcAttrName GetNameInRelatedNc ( );
        NcAttrName GetAlternateAttributeName ( );
}
class NcAttrMetainfo
{
    public:
        NcAttrType GetType( ) const;
        char * GetName( ) const;
        int GetName( ) const;
        char * GetMibObjName ( ) const;
        AccessPolict GetMibAccessPolicy( );
        CachingPolicy GetAchingPolicy( );
        char * GetDefaultValue( );
        void GetIdRoles (voidPtrList & idRoles);
        void GetDotCount ( ) const;
}
class NcAttrGrpMetainfo
{
        public:
            char * GetGrpName ( );
            char * GetMibTable( );
            void GetAllAttrMetainfos (VoidPtrList & attrMetainfos);
            void GetAttrMetainfos (VoidPtrList & attrMetainfos, const StrHashtable &
attrNames);
            NcAttrMetainfo * GetAttrMetainfo (NcAttrName& attrName);
        }
```

What is claimed is:

1. A computerized method comprising:
creating a metadata file, said metadata file defining objects representative of a configuration of components of a router;
reading the metadata file;
converting the metadata file into an object model having at least one object;
configuring the router by loading the objects onto the router;
comparing by the router the objects of the object model to a runtime object model; and
updating the runtime object model with differences identified by the comparison.

2. The computerized method of claim 1, wherein loading the objects onto the router loads the objects into an SNMP (Simple Network Management Protocol) MIB (Management Information Base).

3. The computerized method of claim 1, wherein the metadata file comprises an American Standard Code for Information Interchange (ASCII) formatted file.

4. The computerized method of claim 1, wherein converting the metadata file includes creating a hash table of attribute names and attribute values from the metadata file.

5. The computerized method of claim 1, wherein converting the metadata file comprises converting a required subset of the metadata into an object model.

6. The computerized method of claim 1, further comprising:
 reading a runtime object model from the router;
 comparing the runtime object model to metadata in the metadata file; and
 updating the metadata file with differences identified by the comparison.

7. A method comprising:
 defining a plurality of objects that represent components of a network device by providing, in one or more metadata files accessible by a plurality of applications, meta information regarding the plurality of objects, including descriptions of the plurality of objects, configuration information associated with each of the plurality of objects and information regarding relationships among the plurality of objects in the form of network component class descriptions;
 configuring a network device based on the meta information by reading the meta information, converting the meta information into a meta runtime object model including the plurality of objects configured in accordance with the configuration information and loading the plurality of objects onto the network device;
 updating a current configuration of the network device based on the meta information by
  responsive to an update to the one or more metadata files, reading the meta information from the one or more metadata files;
  converting the meta information into the meta runtime object model;
  comparing objects of a current network device runtime object model to the meta runtime object model; and
  updating the network device runtime object model to account for differences identified by said comparing.

8. The method of claim 7, wherein said configuring a network device based on the meta information comprises restoring the network device to an original configuration.

9. The method of claim 7, further comprising updating the one or more metadata files to reflect a current configuration of the network device by
 identifying objects of a current network device runtime object model;
 reading the meta information from the one or more metadata files;
 converting the meta information into the meta runtime object model;
 comparing the objects of the current network device runtime object model to the meta runtime object model;
 updating appropriate files of the one or more metadata files to account for differences identified by said comparing.

10. The method of claim 7, wherein said loading the plurality of objects onto the network device comprises loading the plurality of objects into a Simple Network Management Protocol (SNMP) Management Information Base (MIB).

11. The method of claim 7, wherein the one or more metadata files comprise American Standard Code for Information Interchange (ASCII) formatted files.

12. The method of claim 7, wherein converting the meta information into a meta runtime object model comprises creating a hash table of attribute names and attribute values from the one or more metadata files.

13. The method of claim 7, wherein converting the meta information into a meta runtime object model comprises converting only a required subset of the meta information into the meta runtime object.

14. The method of claim 8, wherein said updating the network device runtime object model to account for differences comprises disregarding unchanged meta information.

15. A system comprising:
 a meta information means for defining meta information in one or more metadata files regarding a plurality of objects that represent components of a network device in the form of network component class descriptions, the network component class descriptions including descriptions of the plurality of objects, configuration information associated with each of the plurality of objects and information regarding relationships among the plurality of objects; and
 a network device configuration means, responsive to the meta information means, for
 configuring a network device based on the meta information by reading the meta information, converting the meta information into a meta runtime object model including the plurality of objects configured in accordance with the configuration information and loading the plurality of objects onto the network device; and
 updating a current configuration of the network device based on the meta information by, responsive to the meta information means, reading the meta information from the one or more metadata files, converting the meta information into the meta runtime object model, comparing objects of a current network device runtime object model to the meta runtime object model, and updating the network device runtime object model to account for differences identified by said comparing.

16. The system of claim 15, wherein the network device configuration means restores the network device to an original configuration based on the meta information.

17. The system of claim 15, wherein the network device configuration means is further configured to update the one or more metadata files to reflect a current configuration of the network device by
 identifying objects of a current network device runtime object model;
 reading the meta information from the one or more metadata files;
 converting the meta information into the meta runtime object model;
 comparing the objects of the current network device runtime object model to the meta runtime object model; and
 updating appropriate files of the one or more metadata files to account for differences identified by said comparing.

* * * * *